United States Patent
Kouzuma

(10) Patent No.: US 6,643,793 B1
(45) Date of Patent: Nov. 4, 2003

(54) APPARATUS FOR TRANSFERRING AND HOLDING DATA BASED ON A SELECTED CLOCK RATE

(75) Inventor: Shinichi Kouzuma, Miyazaki-gun (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/520,209

(22) Filed: Mar. 7, 2000

(30) Foreign Application Priority Data

Oct. 21, 1999 (JP) .......................................... 11-298971

(51) Int. Cl.$^7$ ................................................ G06F 5/06
(52) U.S. Cl. ...................................................... 713/600
(58) Field of Search .................... 713/600, 400

(56) References Cited

U.S. PATENT DOCUMENTS

| | | | | |
|---|---|---|---|---|
| 4,712,190 A | * | 12/1987 | Guglielmi et al. ........... | 713/600 |
| 5,167,020 A | * | 11/1992 | Kahn et al. .................. | 711/119 |
| 5,255,383 A | * | 10/1993 | Lewis et al. ................. | 713/600 |
| 5,410,717 A | * | 4/1995 | Floro ........................... | 710/104 |
| 5,473,571 A | * | 12/1995 | Shigematsu et al. ........ | 365/227 |
| 5,708,802 A | * | 1/1998 | Morishima et al. ......... | 713/600 |
| 6,336,190 B1 | * | 1/2002 | Yamagishi et al. ......... | 713/400 |
| 6,357,015 B1 | * | 3/2002 | Yamakawa et al. ......... | 713/600 |

FOREIGN PATENT DOCUMENTS

| | | | | | |
|---|---|---|---|---|---|
| JP | 01102796 A | * | 4/1989 | ........... | G11C/19/00 |
| JP | 02050227 A | * | 2/1990 | ........... | G06F/11/22 |
| JP | 07212413 A | * | 8/1995 | ............. | G06F/1/04 |

* cited by examiner

*Primary Examiner*—Thomas Lee
*Assistant Examiner*—Eric Chang
(74) *Attorney, Agent, or Firm*—Venable; Michael A. Sartori

(57) ABSTRACT

A data transfer circuit has a control circuit which outputs a clock control signal and a data control signal and receives a selectively controlled write signal and a fixed voltage level corresponding to a mode instruction signal-. An AND gate acts as a first transfer circuit which transfers the clock signal to a holding circuit corresponding to the clock control signal, and a second transfer circuit transfers a data signal to the holding circuit.

16 Claims, 4 Drawing Sheets

APPARATUS FOR TRANSFERRING AND HOLDING DATA BASED ON A SELECTED CLOCK RATE

BACKGROUND OF THE INVENTION

1. Field of the Invention

This invention relates to a data holding circuit suitable for use in a microcomputer or the like and capable of being controlled by a clock signal and a control signal, outputting a signal corresponding to an input data signal, and holding it therein.

2. Description of the Related Art

A data transfer circuit is one of a type of circuit wherein data inputted to a microcomputer and data to be outputted from the microcomputer are temporarily stored therein, and signals having potential levels corresponding to information about the stored data are outputted therefrom as data and held therein. Owing to the provision of the data transfer circuit, each signal wiring or interconnection used for the transmission of data and the time interval during which each internal circuit built in the microcomputer is used for transferring data can be shortened. Further, the data can be transferred to the corresponding internal circuit to be received with good timing.

Since the data transfer circuit stores the data with satisfactory timing and transfers it therefrom, it is controlled by a clock signal and a control signal. Namely, the data transfer circuit is controlled over its operation in response to a signal for permitting the storage of data, which is used as the control signal, and stores the data in synchronism with the transition of a potential level in a predetermined direction like the falling edge of the clock signal or the rising edge thereof.

In order to provide the high-speed operation which has been desired in recent years, a microcomputer further divides the frequency of an input clock signal (called a normally-used clock signal herein) inside the microcomputer to generate such a high-speed clock signal so as to take one cycle in a 1/n cycle (where n is a positive integer greater than 2) of the normally-used clock signal, and operates its each internal circuit in synchronism with the high-speed clock signal. Alternatively, there may be cases in which a clock signal corresponding to the high-speed clock signal is already inputted to the microcomputer.

However, when the high-speed clock signal is used, the operation of each internal circuit activated according to the high-speed clock signal is also increased by n times in the microcomputer. Therefore, power consumption incident to such an operation will increase.

It is considered that in order to meet the demands of increased operating speeds and low power consumption, the normally-used clock signal and the high-speed clock signal are selectively used in the microcomputer. Namely, the microcomputer recognizes when a high-speed operation is required and sets the mode to a high-speed mode and utilizes the high-speed clock signal for the operation of each internal circuit. When no high-speed operation is required or upon a standby state, the microcomputer sets the mode to a normal mode and uses the normally-used clock signal for the operation of each internal circuit.

However, timing provided to transfer data must be controlled closely to maintain high performance with the increasing speed of the operation of each internal circuit by the high-speed clock signal. To this end, the delay of data due to wiring resistance and capacitance of each signal interconnection must be handled in consideration of transferring the data sufficiently.

As mentioned above, the operation of the data transfer circuit is to be controlled by the clock signal and the control signal. Therefore, let's now assume that the clock signal is selectively supplied with the low power consumption, and the clock signal is supplied so that the data is stored only when the control signal is supplied. In this case, if timing provided to transfer the control signal is delayed due to the wiring resistance and capacitance of each signal interconnection when the data transfer circuit is operated in response to the high-speed clock signal, data to be stored cannot be stored correctly. If the data transfer circuit is always operated according to the transition of the potential level of the high-speed clock signal to avoid such a problem, then this leads to interference with the acquisition of a reduction in power consumption.

The present invention aims to solve the above-described problems and implement a data transfer circuit capable of meeting the demands of increased operating speed and low power consumption.

SUMMARY OF THE INVENTION

The data transfer circuit of the present invention comprises a holding circuit having a clock terminal, a data terminal and an output terminal, the holding circuit outputting an output signal having a determined voltage level according to a voltage level of a signal inputted from said data terminal corresponding with a predetermined change of a voltage level of a signal inputted said clock signal, and holding the outputted signal, a control circuit outputting a clock control signal and a data control signal, one of the clock and data control signals having a voltage level according to said control signal and another one of the clock and data control signals having a predetermined voltage level corresponding to a instruction signal, the instruction signal instructing a first mode changing the voltage level of said clock signal during a predetermined period or a second mode changing the voltage level of said clock signal during a period shorter than thereof the first mode by the voltage level of the instruction signal, a first transfer circuit transferring a signal according to said clock signal or said control signal corresponding to the voltage level of said clock control signal to said clock terminal as a first transfer signal, and a second transfer circuit transferring a signal according to said clock signal or said control signal corresponding to the voltage level of said data control signal to said data terminal as a second transfer signal.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings wherein:

DETAILED DESCRIPTION OF THE PREFERRED EMBODIMENTS

Figure 1:
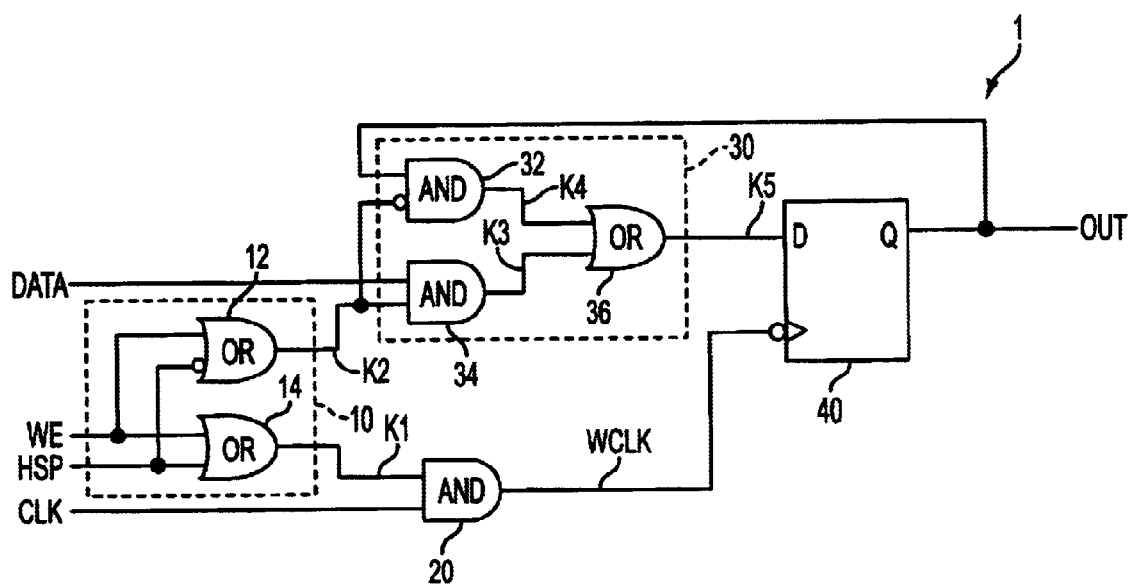
FIG. 1 is a circuit diagram showing a data transfer circuit 1 according to a first embodiment of the present invention.

Data transfer circuits of the present invention will hereinafter be described in detail with reference to the accompanying drawings. In a preferred embodiment of the present invention, the data transfer circuit is built in a one-chip microcomputer. FIG. 1 is a circuit diagram showing a data transfer circuit 1 according to a first embodiment of the present invention.

Referring to FIG. 1, the data transfer circuit 1 comprises a control circuit 10, an AND gate 20 which serves as a first transfer circuit, a second transfer circuit 30, and a D-type flip-flop circuit 40 (hereinafter called "FF circuit 40") which serves as a holding circuit.

In FIG. 1, the control circuit 10 comprises two two-input and one-output OR gates 12 and 14. A signal, e.g., a write signal WE for providing instructions for new storage of data inputted to the data transfer circuit or holding of the data already stored therein is inputted to one input terminal of the OR gate 12 as a control signal. A mode instruction or designation signal HSP for providing instructions for or specifying either a normal operation mode at the time that no high-speed operation is required (i.e., in a normal operating state) or in a standby state, or a high-speed operation mode in a high-speed operating state in which the high-speed operation is required, is inputted to the other input terminal of the OR gate 12 as an instruction signal in a state in which a potential level thereof is inverted.

Further, the write signal WE is inputted to one input terminal of the OR gate 14. The mode instruction signal HSP is inputted to the other input terminal of the OR gate 14.

The present embodiment shows that the new storage of the input data is required of the data transfer circuit when the potential level of the write signal WE is of a source potential level (hereinafter called "H level"). On the other hand, when the potential level of the write signal WE is of a ground potential level (hereinafter called "L level"), the present embodiment states that the holding of the already stored data is required of the data transfer circuit.

When the potential level of the mode instruction signal HSP is of the H level, it indicates the high-speed operation mode. When the potential level of the mode instruction signal HSP is of the L level, it indicates the normal operation mode.

When the potential level of the mode instruction signal HSP is of the L level, a signal K2 whose potential level is of the H level, is outputted from an output terminal of the OR gate 12 regardless of the potential level of the write signal WE, and a signal K1 having a potential level corresponding to the potential level of the write signal WE is outputted from an output terminal of the OR gate 14. When the potential level of the mode instruction signal HSP is of the H level, a signal K2 having a potential level corresponding to the potential level of the write signal WE is outputted from the output terminal of the OR gate 12, and a signal K1 whose potential level is of the H level, is outputted from the output terminal of the OR gate 14 regardless of the potential level of the write signal WE.

In other words, when the normal operation mode is selected (when the potential level of the mode instruction signal HSP is at the L level), the control circuit 10 sets the potential level of the signal K1 to a potential level corresponding to the write signal WE and fixes the potential level of the signal K2 to the H level. On the other hand, when the high-speed operation mode is selected (when the potential level of the mode instruction signal HSP is of the H level), the control circuit 10 fixes the potential level of the signal K1 to the H level and sets the potential level of the signal K2 to a potential level corresponding to the write signal WE. The signal K1 is used as a clock control signal for controlling a clock signal, whereas the signal K2 is used as a data control signal for controlling a data signal. They will be made clear by illustration to be described later.

Referring to FIG. 1, the AND gate 20 is a two-input and one-output type. The signal K1 is inputted to one input terminal of the AND gate 20, and the clock signal CLK is inputted to the other input terminal thereof.

In the embodiment of the present invention, when the high-speed operation mode is selected, the clock signal CLK results in a clock signal shorter in cycle than a clock signal in the normal operation mode, for example, a clock signal having a cycle equal to one-half the cycle of the clock signal in the normal operation mode.

When the potential level of the signal K1 is at the L level, the AND gate 20 outputs a signal WCLK whose potential level is fixed to the L level, from its output terminal regardless of the clock signal CLK. On the other hand, when the potential level of the signal K1 is of the H level, the AND gate 20 outputs a signal WCLK having a potential level corresponding to the clock signal CLK from the output terminal thereof.

In other words, when the normal operation mode in which the potential level of the signal K1 results in one corresponding to the write signal WE, is selected (when the potential level of the mode instruction signal HSP is of the L level), the AND gate 20 permits the transfer of the clock signal CLK when the potential level of the write signal WE is of the H level, and prohibits the transfer of the clock signal when the potential level of the write signal WE is of the L level. Upon the high-speed operation mode in which the potential level of the signal K1 is fixed to the H level (when the potential level of the mode instruction signal HSP is at the H level), the AND gate 20 permits the transfer of the clock signal CLK regardless of the potential level of the write signal WE. Namely, the AND gate 20 is capable of controlling the transfer of the clock signal CLK as the first transfer circuit and outputting the signal WCLK corresponding to the potential level of the clock signal CLK as a first transfer signal.

Referring to FIG. 1, the second transfer circuit 30 comprises two two-input and one-output AND gates 32 and 34, and a two-input and one-output OR gate 36.

A signal OUT outputted from the FF circuit 40 to be described later is inputted to one input terminal of the AND gate 32. The signal K2 is inputted to the other input terminal of the AND gate 32 in a state in which the potential level thereof is inverted. A signal K4 having a potential level equivalent to the logical product or AND of the signals inputted to the two input terminals is outputted from an output terminal of the AND gate 32.

A data signal DATA to be stored is inputted to one input terminal of the AND gate 34. The signal K2 is inputted to the other input terminal of the AND gate 34. A signal K3 having a potential level corresponding to the AND of the signals inputted to the two input terminals is outputted from an output terminal of the AND gate 34.

The signal K3 is inputted to one input terminal of the OR gate 36, and the signal K4 is inputted to the other input terminal thereof. A signal K5 having a potential level equivalent to the OR of the signals K3 and K4 is outputted from an output terminal of the OR gate 36.

Therefore, when the potential level of the signal K2 is of the L level, the AND gate 32 outputs a signal K4 having a potential level corresponding to the potential level of the output signal OUT outputted from the FF circuit 40 from the output terminal thereof. On the other hand, the AND gate 34 outputs a signal K3 whose potential level is fixed to the L level, from the output terminal thereof regardless of the potential level of the data signal DATA. Therefore, the OR gate 36 outputs a signal K5 having a potential level corresponding to the potential level of the signal K4. When the potential level of the signal K2 is of the H level, the AND gate 32 outputs a signal K4 whose potential level is fixed to the L level, from the output terminal thereof regardless of the potential level of the output signal OUT outputted from the FF circuit 40. On the other hand, the AND gate 34 outputs a signal K3 corresponding to the potential level of the data signal DATA from the output terminal thereof. Therefore, the OR gate 36 outputs a signal K5 having a potential level corresponding to the potential level of the signal K3.

In other words, when the high-speed operation mode in which the potential level of the signal K2 results in one corresponding to the write signal WE, is selected (when the potential level of the mode instruction signal HSP is of the H level), the second transfer circuit 30 outputs a signal K5 as a potential level corresponding to the data signal DATA when the potential level of the write signal WE is of the H level, and outputs a signal K5 as a potential level corresponding to the potential level of the output signal OUT of the FF circuit 40 when the potential level of the write signal WE is of the L level. On the other hand, when the normal operation mode in which the potential level of the signal K2 is fixed to the H level, is selected (when the potential level of the mode instruction signal HSP is of the L level), the second transfer circuit 30 outputs a signal K5 as a potential level corresponding to the data signal DATA regardless of the potential level of the write signal WE. Namely, the second transfer circuit 30 is capable of controlling the transfer of the data signal DATA and selectively outputting a signal having a potential level corresponding to the data signal DATA or the output signal OUT of the FF circuit 40.

The FF circuit 40 has a data terminal D, a clock terminal and an output terminal Q. The signal K5 equivalent to the output of the second transfer circuit is inputted to the data terminal D. The signal WCLK equivalent to the output of the first transfer circuit is inputted to the clock terminal with the potential level thereof being inverted.

Namely, the FF circuit 40 serves so as to output a signal having a potential level corresponding to the potential level of the signal K5 as an output signal OUT in response to the falling edge of the signal WCLK and hold it. In other words, the FF circuit 40 has the function of storing information about the signal K5 therein with the signal K5 as a data signal and holding it. In the embodiment of the present invention, if the potential level of a signal used as data is L in level, then the data has information of "0", and if the potential level of the signal used as the data is H in level, then the data has information of "1".

As is understood from the above description, the entire operation of the data transfer circuit 1 shown in FIG. 1 is as follows:

When the potential level of the mode instruction signal HSP is of the L level (normal operation mode), the signal K5 having the potential level corresponding to the potential level of the data signal DATA is brought to a state of being always inputted to the input terminal D of the FF circuit 40. Thus, the transfer of the clock signal CLK to the clock terminal of the FF circuit 40 is controlled by the write signal WE. When the potential level of the write signal WE is of the H level, the data transfer circuit 1 stores the data signal DATA therein in response to the falling edge of the signal WCLK having the potential level corresponding to the potential level of the clock signal CLK. When the potential level of the write signal WE is of the L level, the data transfer circuit 1 fixes the potential level of the signal WCLK to the L level, prohibits the data storing operation of the FF circuit 40 and holds the stored data signal DATA thereat.

In the normal operation mode as described above, the FF circuit 40 is allowed to execute its storing operation upon storage of new data therein, and the FF circuit 40 is not allowed to execute its storing operation at all other times during operation at normal speed. Therefore, power consumption incident to the storing operation of the FF circuit 40 during operation at normal speed is reduced. It is thus possible to reduce power consumption of the data transfer circuit 1 or the entire device with the data transfer circuit 1 built therein.

Next, when the potential level of the mode instruction signal HSP is of the H level (high-speed operation mode), the signal WCLK having the potential level corresponding to the potential level of the clock signal CLK is brought to a state of being always inputted to the clock terminal of the FF circuit 40. Thus, the transfer of the data signal DATA to the data terminal D of the FF circuit 40 is controlled by the write signal WE. Therefore, when the potential level of the write signal WE is of the H level, the data transfer circuit 1 stores the data signal DATA therein in response to the falling edge of the signal WCLK. On the other hand, when the potential level of the write signal WE is of the L level, the data transfer circuit 1 stores the output signal OUT fed back to the data terminal D therein in response to the falling edge of the signal WCLK.

Namely, the FF circuit 40 always performs the storing operation for each falling edge of the signal WCLK in the high-speed operation mode regardless of the potential level of the write signal WE. However, since the FF circuit 40 stores the output signal OUT therein as new data when the potential level of the write signal WE is of the L level, it serves so as to functionally hold the stored data.

Since the FF circuit 40 always performs the storing operation in this case, the FF circuit 40 serves so as to easily control the data signal DATA to set a data transfer period according to the write signal WE in consideration of a delay although the power consumption cannot be reduced during high speed operation.

Now consider where the data transfer circuit 1 functions in the normal operation mode, for example. In this case, there may be a case in which the write signal WE is delayed and the potential level of the write signal WE results in the H level during a period including a falling edge A of the clock signal CLK and a subsequent rising edge B thereof. Even if the potential level of the write signal WE is brought to the L level before falling edge C of the clock signal CLK subsequent to the rising edge B, the signal WCLK produces the falling edge twice. Assuming that the potential level of the data signal DATA is of the H level on the falling edge A and the potential level thereof is of the L level on the rising edge B, the FF circuit 40, which is to hold the information ("1") in which the potential level of the data signal DATA is of the H level, stores and holds "1" therein as information at the first falling edge of the signal WCLK but stores and holds "0" therein as information at the second falling edge thereof. Therefore, the data transfer circuit 1 would fall into the execution of the transfer of incorrect data. Such a problem seldomly arises in the case of the normal operation mode in which the period of one cycle of the clock signal CLK is relatively long. However, in the case of the high-speed operation mode in which the period of one cycle of the clock signal CLK is short, the above-described problem is apt to occur when the function of the data transfer circuit 1 in the normal operation mode is used as it is.

Therefore, in the present invention, the potential level of the signal WCLK is always set to one corresponding to the potential level of the clock signal CLK in the high-speed operation mode, and the data signal DATA is controlled according to the write signal WE, as described above. Let's now discuss the occurrence of the above-described delay of write signal WE. Namely, let's assume that the write signal WE is delayed, the potential level of the write signal WE is brought to the H level at the certain falling edge A and subsequent rising edge B of the clock signal CLK, whereas the potential level of the write signal WE is brought to the L level at the falling edge C of the clock signal CLK subsequent to the rising edge B. Let's also assume that the potential level of the data signal DATA is brought to the H level at the falling edge A and the potential level thereof is brought to the L level at the rising edge B.

In such a case, when the function of the data transfer circuit 1 in the high-speed operation mode, according to the present invention is used, a signal K5 having a potential level corresponding to the potential level of the data signal DATA is inputted to the data terminal D of the FF circuit 40 on the falling edge A of the clock signal CLK. Therefore, the FF circuit 40 substantially stores and holds "1" as information in response to the rising edge A of the clock signal CLK. While the potential level of the data signal DATA is L in level on the rising edge B of the clock signal CLK, a signal K5 having a potential level corresponding to the potential level of the output signal OUT of the FF circuit 40 is inputted to the data terminal D of the FF circuit 40 at the falling edge C. Therefore, the FF circuit 40 substantially stores and holds "1" as fed-back information again therein in response to the falling edge C subsequent to the rising edge B of the clock signal CLK. Thus, the storage of the incorrect data due to the above-described delay of write signal WE can be prevented from occurring.

As described above, the data transfer circuit 1 according to the present invention can meet the demands of increased operating speeds and low power consumption thereof by selectively changing the operation of the data transfer circuit 1 between the normal operation mode and the high-speed operation mode.

Since the data transfer circuit 1 according to the present invention shares the use of structures holdable in common wherever possible in order to realize it, the number of elements which constitute the data transfer circuit 1 of the present invention can be reduced. Further, the area on a semiconductor chip, which is necessary to provide the data transfer circuit 1 according to the present invention, can also be reduced. In the present invention as described above, the function required as the data transfer circuit is not impaired in either the case of the normal operation mode or the high-speed operation mode.

Figure 2:
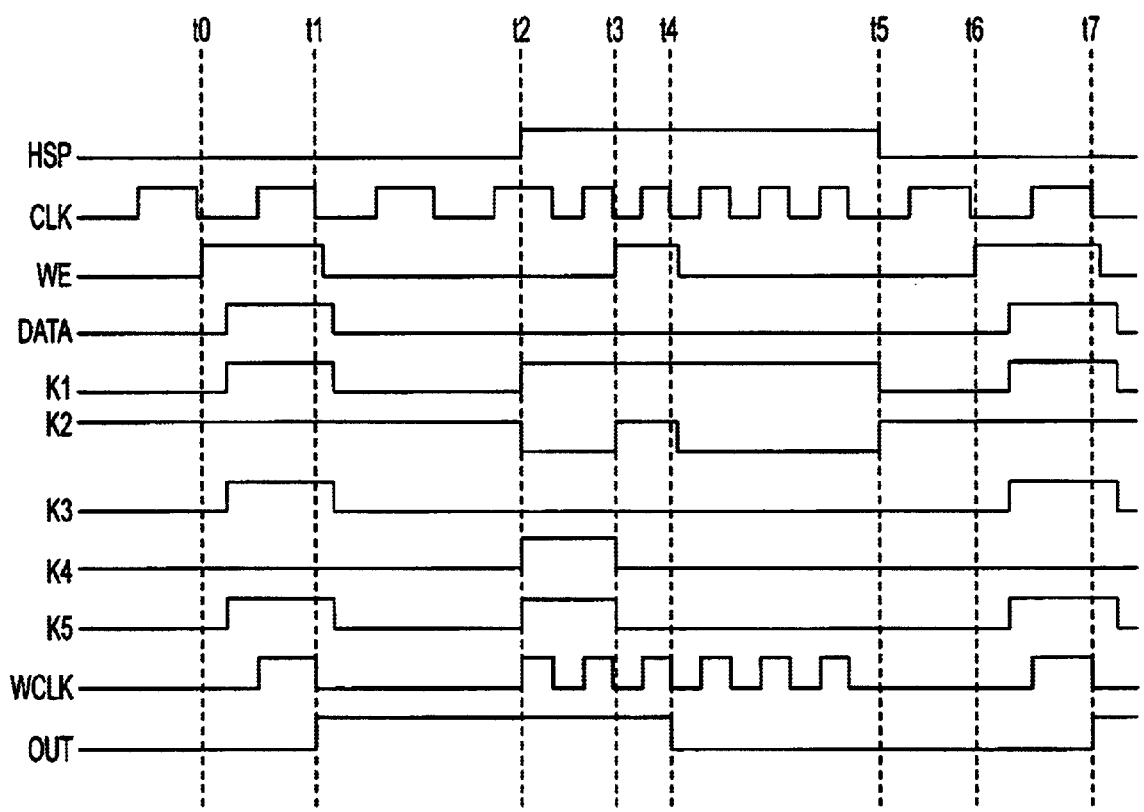
FIG. 2 is a timing chart for describing the operation of the data transfer circuit of FIG. 1 according to the present invention.

Specific operation of the data transfer circuit 1 according to the present invention will now be explained with reference to the drawings. FIG. 2 is a timing chart illustrating the operation of the data transfer circuit 1 according to the present invention. In FIG. 2, the signal names of respective waveforms are shown on the left sides of the waveforms.

The clock signal CLK, mode instruction signal HSP and write signal WE may respectively be inputted from peripheral devices provided outside the one chip microcomputer having the data transfer circuit 1 built therein. Alternatively, the clock signal CLK, mode instruction signal HSP and write signal WE may be generated by the one chip microcomputer.

Figure 3:
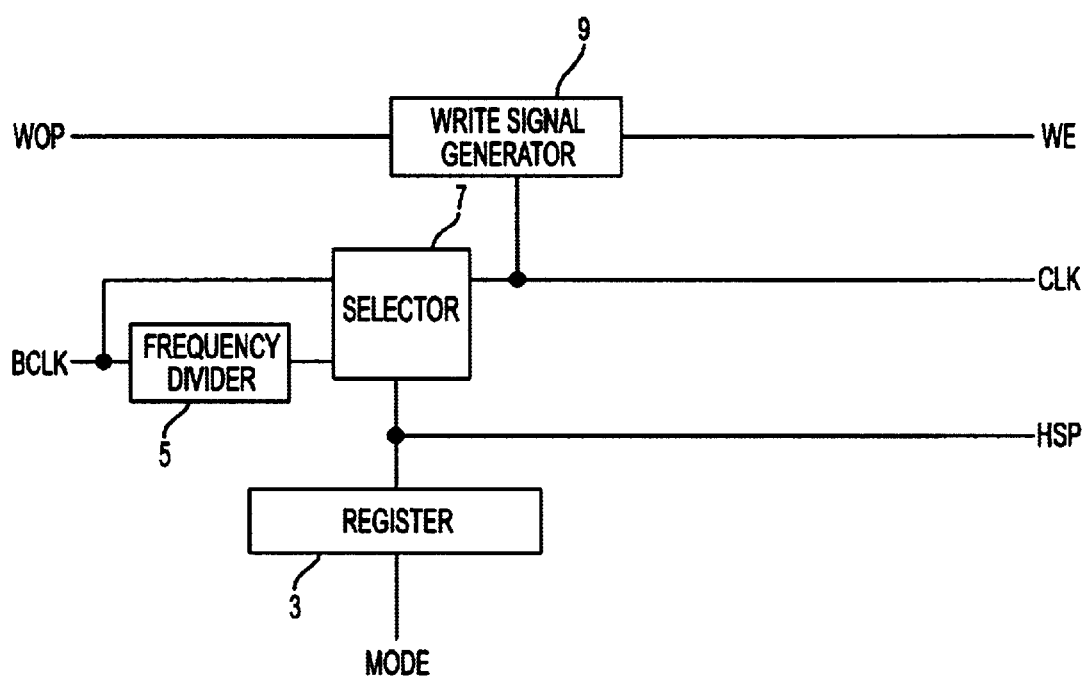
FIG. 3 is a diagram showing a circuit for generating input signals to the data transfer circuit of FIG. 1.

A circuit configuration for generating the clock signal CLK, mode instruction signal HSP and write signal WE where these signals are generated by the one chip microcomputer, will be explained with reference to the drawings prior to the description of the operation of the data transfer circuit 1. FIG. 3 is a diagram showing a circuit for generating the above-described signals.

A register 3, a frequency divider 5, a selector 7 and a write signal generator 9, which are built in the one chip microcomputer with the data transfer circuit 1 according to the present invention are shown in FIG. 3.

The register 3 is inputted with a flag MODE for providing instructions for or specifying the normal operation mode and the high-speed operation mode, and stores the flag MODE therein and outputs it as a mode instruction signal HSP. If information on the flag MODE is "0", for example, then the potential level of the mode instruction signal HSP is outputted as the L level. If the information on the flag MODE is "1", then the potential level of the mode instruction signal HSP is outputted as the H level. In the embodiment of the present invention, the register 3 is comprised of a latch for storing one-bit information therein.

The frequency divider 5 generates and outputs signals obtained by dividing the frequency of a basic clock signal BCLK inputted from the device provided outside the one chip microcomputer into 1/n (where n is a positive integer greater than 2). The basic clock signal BCLK has the same cycle as that of the clock signal in the normal operation mode. Since n=2 when in the high-speed operation mode according to an embodiment of the present invention, it can be said that each signal outputted from the frequency divider 5 results in a clock signal having a cycle shorter than in the normal operation mode and equal to one-half the cycle of the basic clock signal BCLK.

The selector 7 selects either one of the inputted basic clock signal BCLK and the signal outputted from the frequency divider 5 according to the potential level of the mode instruction signal HSP and outputs it as a clock signal CLK. When the potential level of the mode instruction signal HSP is L in level, the selector 7 selects the basic clock signal BCLK and outputs a signal corresponding to the potential level of the basic clock signal BCLK as the clock signal CLK. When the potential level of the mode instruction signal HSP is H in level, the selector 7 selects a signal outputted from the frequency circuit 5 and outputs a signal corresponding to the potential level of the signal outputted from the frequency divider 5 as the clock signal CLK.

The write signal generator 9 receives a write point-out or instruction signal WOP inputted from the device provided outside the one chip microcomputer therein and outputs a write signal WE whose potential level is brought to the H level by one cycle of the clock signal CLK, according to the clock signal CLK outputted from the selector 7. For example, the write instruction signal WOP may be one like a one-shot pulse. The write signal WE is generated based on the one-shot pulse.

Incidentally, FIG. 3 shows one example of the circuit and the scope of the invention is by no means limited to this example. For example, the write signal generator 9 for generating the write signal WE may be deleted. If the write signal generator 9 is provided, then it can generate a write signal WE in synchronism with the clock signal CLK. If the write signal generator 9 is not provided, it is then necessary to set the write instruction signal WOP as such a write signal WE as employed in the present embodiment. When the write instruction signal WOP is set as such a write signal WE as employed in the present embodiment, it is preferable to allow a period in which the potential level of the write signal WE in the high-speed operation mode is H in level to differ from that in the normal operation mode (to be shorter than in the normal operation mode). However, it is not necessarily required. This is because since the data signal DATA (see FIG. 1) other than the clock signal CLK is controlled by the write signal WE in the high-speed operation mode, the above-described storage of incorrect data is not carried out. Further, clock signals having two types of different cycles are inputted from outside the one chip microcomputer and may be selectively used as the clock signal CLK by the mode instruction signal HSP. Since the frequency divider 5 can be omitted although the number of external terminals increases in this case, this can contribute to a reduction in power consumption and a size reduction in the semiconductor chip which constitutes the one chip microcomputer.

Even in the case where the frequency divider 5 is provided, the operation thereof may be controlled according to the mode instruction signal HSP without performing its operation at all times. When the potential level of the mode instruction signal HSP is L in level, for example, the operation of the frequency divider 5 may be prohibited. When the potential level of the mode instruction signal HSP is H in level, the frequency divider 5 may be operated. In doing so, the one chip microcomputer can reduce power consumption. Further, the frequency divider 5 may be caused to have the function of the selector 7.

Referring back to FIG. 2, the operation of the data transfer circuit 1 according to the present invention will be explained. Let's now assume that the potential level of any of the mode instruction signal HSP, write signal WE and data signal DATA outputted from the circuit shown in FIG. 3 is of the L level as an initial state. The operation of the data transfer circuit 1 is placed in the normal operation mode in the initial state. Any of the potential levels of the signals K1, K3, K4 and K5 is of the L level, and the potential level of the signal K2 is H in level. In the initial state, the potential level of the output signal OUT is also L in level.

The potential level of the write signal WE generated according to the clock signal CLK is brought to the H level at a time t0 slightly delayed from the falling edge of the clock signal CLK. This state is maintained until a time t1 corresponding to one cycle of the clock signal CLK. The delay of the write signal WE results from an operating time (time required up to the generation of the write signal WE) of the write signal generator 9 synchronized with the clock signal CLK, for example. The potential level of the signal WCLK corresponds to the potential level of the clock signal CLK while the potential level of the write signal WE is H in level.

Thereafter, the potential level of the data signal DATA is brought to the H level with timing between the time t0 and the time t1. This state is maintained till the time exceeding the time t1. The potential levels of the signals K3 and K5 respectively result in one corresponding to the potential level of the data signal DATA. The holding circuit 40 outputs an output signal OUT having an H level corresponding to the potential level of the signal K5 in response to the falling edge of the signal WCLK at the time t1 and holds it. Since the signal WCLK does not fall between the time t1 and a time t2 after the potential levels of the write signal WE and the data signal DATA have been brought to the L level, the potential level of the output signal OUT is maintained at the H level as it is.

At the time t2, the potential level of the mode instruction signal HSP is changed from the L to the H level. Namely, the one chip microcomputer with the data transfer circuit 1 built therein is switched from the normal operation mode to the high-speed operation mode at the time t2. Therefore, the clock signal CLK results in a clock signal having a cycle (corresponding to the cycle equal to one-half that at the time prior to the time t2) shorter than before the time t2. Since the potential level of the signal K1 is maintained at the H level, the potential level of the signal WCLK results in one corresponding to the potential level of the clock signal CLK. Since the signal K2 results in one corresponding to the potential level of the write signal WE, it becomes L in level. Therefore, the potential level of the signal K3 is maintained at the L level, and the potential level of the signal K4 is brought to the H level according to the potential level of the output signal OUT. Thus, the potential level of the signal K5 is also rendered H in level.

Thereafter, since the potential level of the signal K1 is maintained at the H level during a period (from the time t2 to a time t5) in which the potential level of the mode instruction signal HSP is of the H level, the holding circuit 40 performs the operation of storing data (corresponding to the potential level of the signal K5) inputted to the data terminal D for each falling edge of the signal WCLK.

Now, the holding circuit 40 is operated so as to hold the potential level of the signal K5 on the falling edge of the signal WCLK between the time t2 and the time t3. However, since the potential level of the signal K5 is H in level at this time, the potential level of the output signal OUT is maintained at the H level as it is.

At the time t3, the potential level of the write signal WE is brought to the H level and this state is maintained up to the time t4 equivalent to one cycle of the clock signal CLK. Therefore, the potential level of the signal K2 is brought to the H level according to the potential level of the write signal WE.

Further, the potential level of the signal K4 is maintained at the L level according to the potential level of the signal K2. The potential level of the signal K3 is brought to the L level according to the potential level of the data signal DATA. As a result, the potential level of the signal K5 becomes L in level.

At the time t4, the holding circuit 40 is activated so as to hold the potential level of the signal K5 in response to the falling edge of the signal WCLK. Since the signal K5 whose potential level is L in level, is inputted to the data terminal D (see FIG. 1), the holding circuit 40 outputs an output signal OUT having an L level corresponding to the potential level of the signal K5 and holds it.

The potential level of the write signal WE is rendered L in level with a slight delay from the time t4. Therefore, the potential level of the signal K2 is brought to the L level, the potential level of the signal K3 is maintained at the L level, and the potential level of the signal K4 becomes L in level according to the potential level of the output signal OUT. As a result, the potential level of the signal K5 is brought to the L level.

On each falling edge of the signal WCLK up to the time t5, the holding circuit 40 is operated so as to hold the potential level of the signal K5. Since the potential level of the signal K5 is L in level at this time, the potential level of the output signal OUT is maintained at the L level as it is.

At the time t5, the potential level of the mode instruction signal HSP changes from the H level to the L level. Namely, the one chip microcomputer with the data transfer circuit 1 built therein switches from the high-speed operation mode to the normal operation mode at the time t5. Therefore, any of the clock signal CLK, signals K1 through K5 and signal WCLK is brought to a potential level similar to the initial state.

It is understood from FIG. 2 that since, at a time t6, the respective signals are held in a state similar to that at the time t0, the data transfer circuit 1 performs operation similar to that at the time t0. It is understood from FIG. 2 that since, at a time t7, the respective signals are held in a state similar to that at the time t1, the data transfer circuit 1 performs operation similar to that at the time t1.

In the data transfer circuit 1 according to the present invention as described above, the function set as the data transfer circuit is not impaired and the high-speed operation thereof can be achieved with low power consumption thereof. Further, the data transfer circuit 1 according to the present invention can be comprised of a logic circuit as shown in FIG. 1 and may be implemented using fewer components.

The data transfer circuit 1 according to the present invention is not limited to the configuration shown in FIG. 1. If, for example, a function similar to that of the data transfer circuit 1 shown in FIG. 1 can be implemented, other logic gates may be used in place of the AND gates and OR gates shown in FIG. 1. FIG. 1 shows an exemplary configuration suitable for implementing the data transfer circuit for solving the problems of the present invention.

Figure 4:
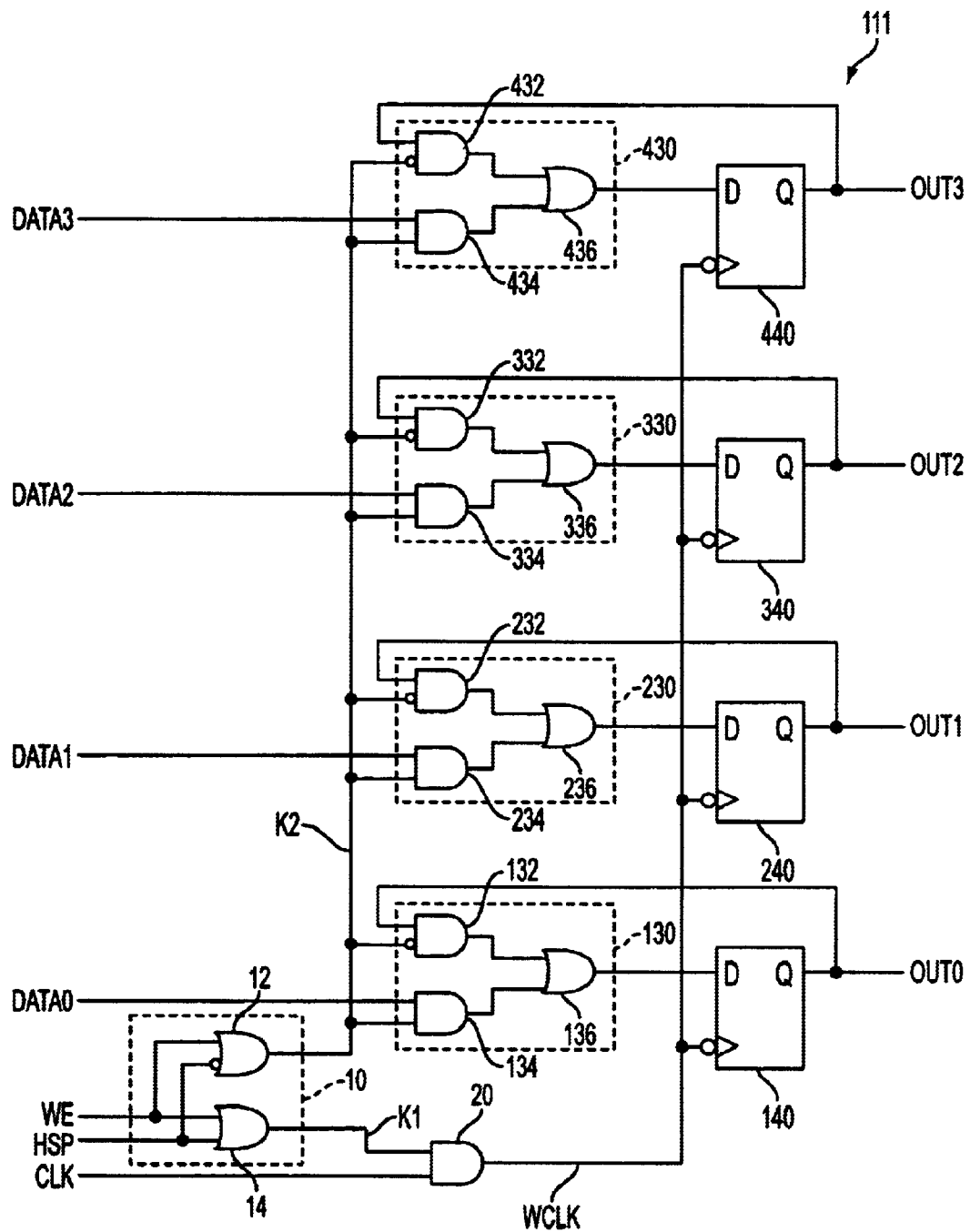
FIG. 4 is a circuit diagram showing a data transfer circuit according to a second embodiment.

A data transfer circuit according to a second embodiment of the present invention will next be described with reference to the drawings. FIG. 4 is a circuit diagram showing a data transfer circuit 111 according to the second embodiment. In FIG. 4, the same elements of structure as those shown in FIG. 1 are identified by the same reference numerals as those in FIG. 1 for simplification of illustration.

Referring to FIG. 4, a control circuit 10 and a first transfer circuit 20 are similar to those shown in FIG. 1. In FIG. 4, a plurality of data signals DATA0 through DATA3 are inputted. According to the input of the data signals, a plurality of second transfer circuits 130, 230, 330 and 430 and a plurality of holding circuits 140, 240, 340 and 440 are provided. For simplification of illustration, four data signals are shown in FIG. 4.

Data processed by a one chip microcomputer may often be comprised of a plurality of bits. FIG. 4 shows the data transfer circuit 111 suitable for use with data comprised of a plurality of bits.

The second transfer circuits 130, 230, 330 and 430 are respectively similar in configuration to the second transfer circuit 30 shown in FIG. 1. AND gates 132, 232, 332 and 432 in the respective second transfer circuits shown in FIG. 4 respectively correspond to the AND gate 32 shown in FIG. 1. AND gates 134, 234, 334 and 434 in the respective second transfer circuits shown in FIG. 4 respectively correspond to the AND gate 34 shown in FIG. 1. OR gates 136, 236, 336 and 436 in the respective second transfer circuits shown in FIG. 4 respectively correspond to the OR gate 36 shown in FIG. 1.

Namely, output signals OUT0, OUT1, OUT2 and OUT3 are inputted to one input terminal of the AND gates 132, 232, 332 and 432, respectively. A signal K2 is commonly inputted to the other input terminal of AND gates 132, 232, 332 and 432, respectively from the control circuit 10 with its potential level being inverted. Data signals DATA0, DATA1, DATA2 and DATA3 are inputted to one input terminal of the AND gates 134, 234, 334 and 434, respectively. The signal K2 is commonly inputted to the other input terminal of the AND gates 134, 234, 334 and 434, respectively from the control circuit 10.

Output signals (respectively corresponding to the signal K4 shown in FIG. 1) of the AND gates 132, 232, 332 and 432 are inputted to one input terminals of the OR gates 136, 236, 336 and 436, respectively. Output signals (respectively corresponding to the signal K3 shown in FIG. 1) of the AND gates 134, 234, 334 and 434 are inputted to the other input terminals of the OR gates 136, 236, 336 and 436, respectively. Signals outputted from the OR gates 136, 236, 336 and 436 respectively correspond to the signal K5 shown in FIG. 1.

The holding circuits 140, 240, 340 and 440 are respectively comprised of D-type flip-flop circuits. The holding circuits 140, 240, 340 and 440 respectively correspond to the FF circuit 40 shown in FIG. 1.

Namely, the FF circuits 140, 240, 340 and 440 have data terminals D, clock terminals and output terminals Q respectively. The signals outputted from the output terminals of the OR gates 136, 236, 336 and 436 are inputted to the data terminals D of the FF circuits 140, 240, 340 and 440 respectively. A signal WCLK is commonly inputted to the clock terminals of the FF circuits 140, 240, 340 and 440. The output signals OUT0, OUT1, OUT2 and OUT3 are outputted from the output terminals Q of the FF circuits 140, 240, 340 and 440 respectively.

Let's take note of the data signal DATA2, for example. The control circuit 10, first transfer circuit 20, second transfer circuit 330 and FF circuit 340 serve to store the data signal DATA2 and are similar in configuration to the data transfer circuit shown in FIG. 1. In a manner similar even to other data signals DATA0, DATA1 and DATA3, the respective circuits serve so as to store their corresponding data signals under their configurations similar to the data transfer circuit shown in FIG. 1.

As is understood from the above description, when a mode instruction signal HSP and a write signal WE respectively having potential levels similar to those shown in FIG. 2 are inputted, the data comprised of the plurality of bits respectively, which are transferred as the data signals DATA0 through DATA3, can respectively be transferred and controlled in a manner similar to the case shown in FIG. 1.

In FIG. 4, the control circuit 10 and the first data transfer circuit 20 are shared between the configurations for storing the respective data signals DATA0 through DATA3. Thus, the present invention is capable of restricting an increase in the number of the elements of structure used for the data transfer circuit with respect to the data comprised of the plurality of bits to as low a number as possible. Since timings for effecting storage processing on the respective data signals DATA0 through DATA3 can be synchronized with one another, the timings for their storage processing can be executed with satisfactory accuracy.

Although the data transfer circuit 111 has been described with the 4-bit data as an illustrative example, it is not limited to this. The data transfer circuit 111 can be applied to data comprised of a plurality of bits corresponding to 2 bits or more.

The data transfer circuit according to the present invention is not necessarily limited to the above-described embodiments. Various changes and modifications can be made thereto.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A data transfer circuit controlled by a clock signal and a control signal, the data transfer circuit outputting and holding a signal corresponding to an inputted data signal, the data transfer circuit comprising:

a holding circuit having a clock terminal, a data terminal and an output terminal, the holding circuit outputting an output signal having a determined voltage level according to a voltage level of a signal inputted to said data terminal corresponding with a predetermined change of a voltage level of a signal inputted to said clock terminal, and holding the outputted signal;

a control circuit outputting a clock control signal and a data control signal, one of the clock and data control signals having a voltage level according to said control signal and another one of the clock and data control signals having a predetermined voltage level corresponding to an instruction signal, the instruction signal instructing a first mode changing the voltage level of said clock signal during a predetermined period or a second mode changing the voltage level of said clock signal during a period shorter than the period of the first mode by the voltage level of the instruction signal;

a first transfer circuit transferring a signal according to said clock signal or said control signal corresponding to the voltage level of said clock control signal to said clock terminal as a first transfer signal; and a second transfer circuit transferring a signal according to said clock signal or said control signal corresponding to the voltage level of said data control signal to said data terminal as a second transfer signal.

2. The data transfer circuit according to claim 1, wherein said data transfer circuit receives a plurality of inputted data signals and comprises:

A plurality of holding circuits; and

A plurality of second transfer circuits according to a number of said plurality of inputted data signals, and wherein said first transfer circuit transfers a signal to the clock terminal of each of said plurality of holding circuits, and said data control signal is transferred to each of said plurality of second transfer circuits.

3. The data transfer circuit according to claim 1, wherein said control signal comprises at least one of (a) a first voltage level instructing to permit transferring said data signal to said holding circuit, and (b) a second voltage level instructing to prohibit transferring said data signal to said holding circuit.

4. The data transfer circuit according to claim 2, wherein said control signal comprises at least one of (a) a first voltage level instructing to permit transferring said data signal to said holding circuit, and (b) a second voltage level instructing to prohibit transferring said data signal to said holding circuit.

5. The data transfer circuit according to claim 3, wherein said data transfer circuit uses the clock signal corresponding to at least one of said first mode and said second mode during a period of said first voltage level of said control signal.

6. The data transfer circuit according to claim 4, wherein said data transfer circuit uses the clock signal corresponding to at least one of said first mode and said second mode during a period of said first voltage level of said control signal.

7. The data transfer circuit according to claim 1, wherein said holding circuit comprises a D-type flip-flop.

8. The data transfer circuit according to claim 1, wherein said control circuit comprises first and second logical OR gates, the first logical OR gate receiving as a first input the control signal and as a second input an inverted instruction signal, the first logical OR gate outputting the data control signal, and wherein the second logical OR gate receives as a first input the control signal and as a second input the instruction signal, said second logical OR gate outputting the clock control signal.

9. The data transfer circuit according to claim 1, wherein said first transfer circuit comprises a logical AND gate receiving as a first input the clock signal and as a second input the clock control signal, said AND gate outputting said first transfer signal to the clock terminal of the holding circuit.

10. The data transfer circuit according to claim 1, wherein said second transfer circuit comprises first and second logical AND gates and one logical OR gate, the first logical AND gate receiving as a first input the output signal from the holding circuit and as a second input an inverted data control signal signal, said first logical AND gate outputting an output signal, and wherein the second logical AND gate receives as a first input the inputted data signal and as a second input the data control signal, said second logical AND gate outputting an output signal, and wherein the logical OR gate receives as a first input the output from the first logical AND gate and as a second input the output from the second logical AND gate and outputs said second transfer signal to the data terminal of the holding circuit.

11. A means for transferring data, the transferring means being controlled by a clock signal and a control signal and outputting and holding a signal corresponding to an inputted data signal and comprising:

a means for holding data, the holding means having a clock terminal, a data terminal and an output terminal, and outputting an output signal having a determined voltage level according to a voltage level of a signal inputted to said data terminal corresponding with a predetermined change of a voltage level of a signal inputted to said clock terminal;

a means for controlling the clock signal and the control signal, the controlling means outputting a clock control signal and a data control signal, one of the clock and data control signals having a voltage level according to said control signal and another one of the clock and data control signals having a predetermined voltage level corresponding to an instruction signal, the instruction signal instructing a first mode changing the voltage level of said clock signal during a predetermined period or a second mode changing the voltage level of said clock signal during a period shorter than the period of the first mode by the voltage level of the instruction signal;

a first means for transferring a signal according to said clock signal or said control signal corresponding to the voltage level of said clock control signal to said clock terminal as a first transfer signal; and a second means for transferring a signal according to said clock signal or said control signal corresponding to the voltage level of said data control signal to said data terminal as a second transfer signal.

12. The transferring means according to claim 11 wherein said holding means comprises a plurality of inputted data signals and comprises:

A plurality of holding circuits; and

A plurality of second transfer circuits according to a number of said plurality of inputted data signals, and wherein said first transfer circuit transfers a signal to the clock terminal of each of said plurality of holding circuits, and said data control signal is transferred to each of said plurality of second transfer circuits.

13. The transferring means according to claim 11, wherein said control signal comprises at least one of (a) a first voltage level instructing to permit transferring said data signal to said holding circuit, and (b) a second voltage level instructing to prohibit transferring said data signal to said holding circuit.

14. The transferring means according to claim 12, wherein said control signal comprises at least one of (a) a first voltage level instructing to permit transferring said data signal to said holding circuit, and (b) a second voltage level instructing to prohibit transferring said data signal to said holding circuit.

15. The transferring means according to claim 13, wherein said transferring means uses the clock signal corresponding to at least one of said first mode and said second mode during a period of said first voltage level of said control signal.

16. The transferring means according to claim 14, wherein said transferring means uses the clock signal corresponding to at least one of said first mode and said second mode during a period of said first voltage level of said control signal.

* * * * *